(No Model.) 2 Sheets—Sheet 1.
N. M. HARRISON.
FLOUR RECEPTACLE AND SIFTER.
No. 422,937. Patented Mar. 11, 1890.
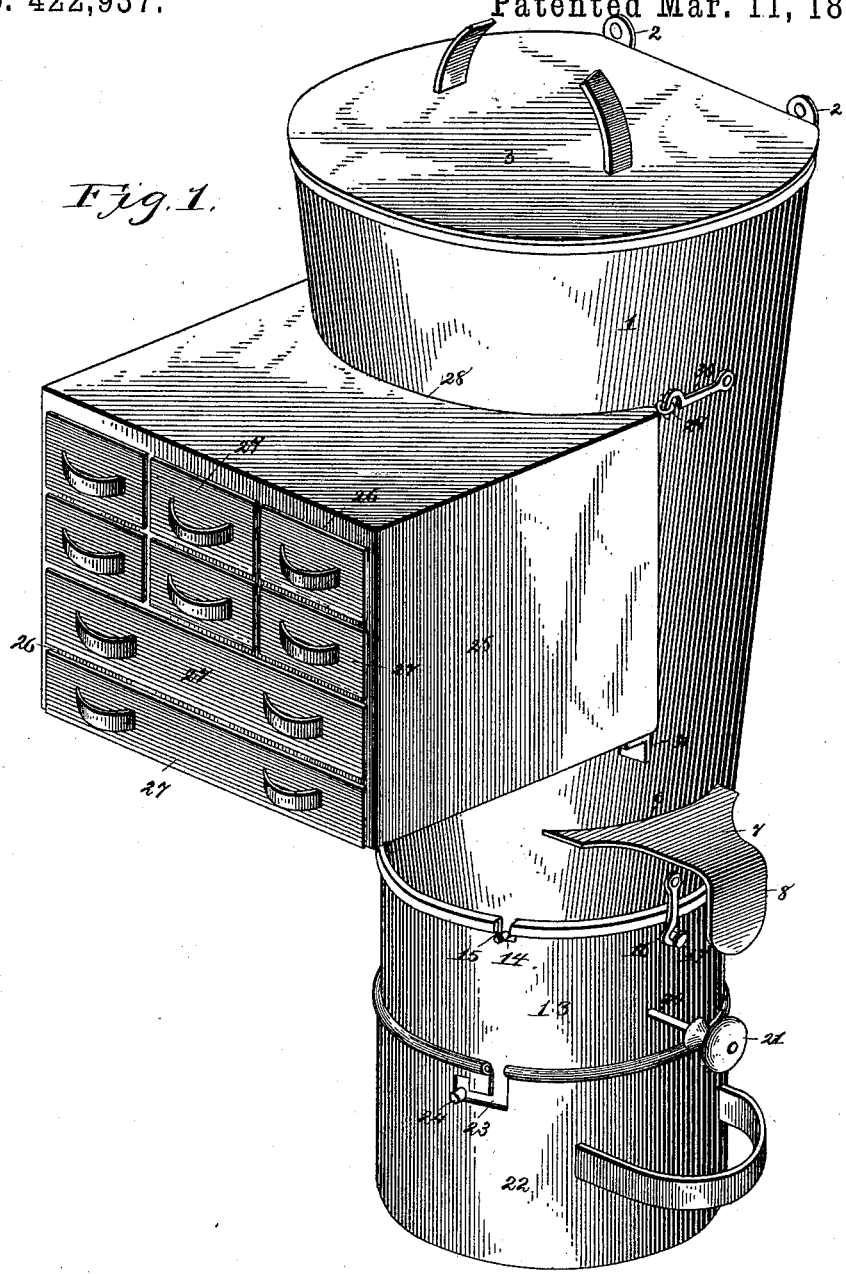
Witnesses: Inventor
　　　　　By her Attorneys, Nancy M Harrison (No Model.) 2 Sheets—Sheet 2.
N. M. HARRISON.
FLOUR RECEPTACLE AND SIFTER.
No. 422,937. Patented Mar. 11, 1890.
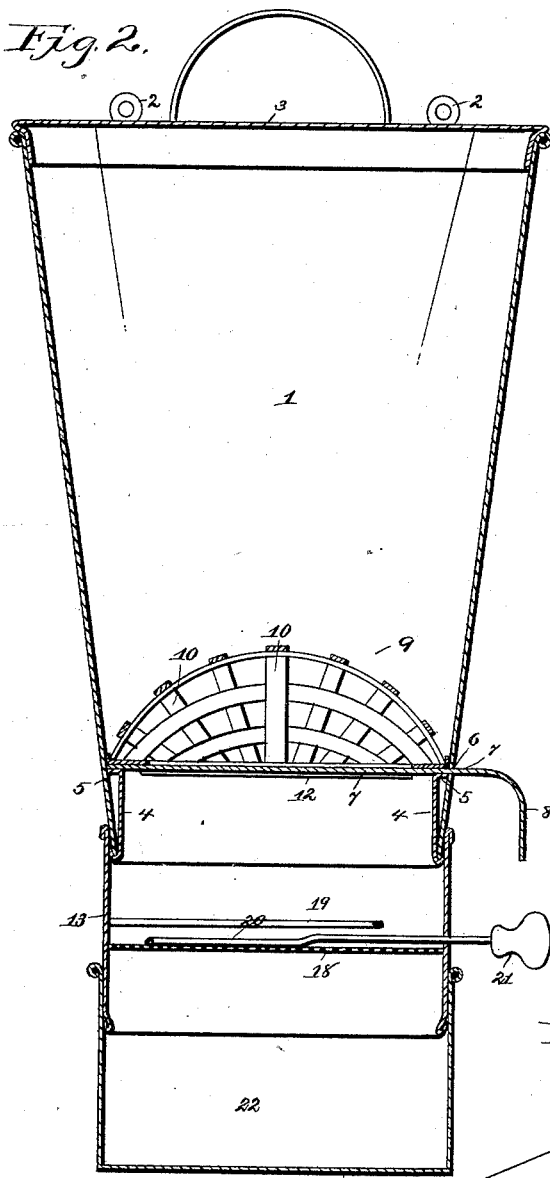
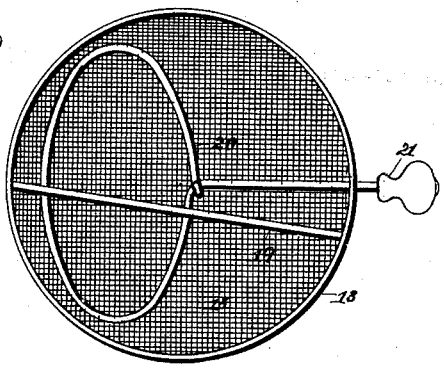
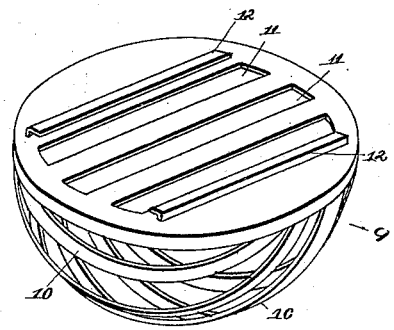
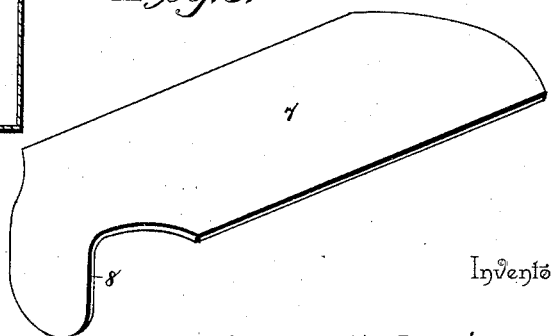
Witnesses: Inventor
Nancy M. Harrison
By her Attorneys,
C. A. Snow & Co.

UNITED STATES PATENT OFFICE.

NANCY MALINDA HARRISON, OF ADAIR, IOWA.

FLOUR RECEPTACLE AND SIFTER.

SPECIFICATION forming part of Letters Patent No. 422,937, dated March 11, 1890.

Application filed September 28, 1889. Serial No. 325,397. (No model.)

*To all whom it may concern:*

Be it known that I, NANCY MALINDA HARRISON, a citizen of the United States, residing at Adair, in the county of Adair and State of Iowa, have invented a new and useful Flour Receptacle and Sifter, of which the following is a specification.

This invention has relation to a combined flour receptacle and sifter; and the objects and advantages of the same will hereinafter appear and the novel features will be particularly pointed out in the claims.

Referring to the drawings, Figure 1 is a perspective of a flour chest and sifter constructed in accordance with my invention, the same being secured in position upon a wall or other fixed support. Fig. 2 is a vertical longitudinal section of the same. Fig. 3 is a transverse section taken above the agitator. Fig. 4 is a detail in perspective of the flour-feeding device. Fig. 5 is a detail in perspective of the cut-off.

Like numerals indicate like parts in all the figures of the drawings.

1 represents the flour receptacle or cylinder, formed of sheet metal and gradually reduced toward its lower end. The rear side of the cylinder is flattened and provided with a pair of suspension perforated lugs 2, through which, by means of nails or other suspension devices, said receptacle is supported upon a wall or other fixed object. The mouth or upper end of the cylinder is provided with a removable cover 3. The lower reduced end of the cylinder is provided with an internal collar 4, forming an upper shoulder 5. A slit 6 is formed in the cylinder immediately above the shoulder, and mounted within the slit is an oblong-shaped cut-off 7, the inner end of the cut-off being supported by the shoulder and the outer end of the cut-off projecting outside of the cylinder and bent to form a handle 8.

9 represents a flour-supporting frame, and the same is of hemispherical shape, the upper surface being convexed and formed of a series of curved strips 10, crossing each other, and the bottom of the same being flat and being provided with a series of strips spaced apart to form feed-openings 11. The bottom is closed and forms a cut-off, and is provided with opposite ways 12, which receive the opposite edges of the cut-off. From this it will be observed that when the cut-off is open or drawn out flour in sufficient quantity will be permitted to escape through the support, and that when the cut-off is closed or pushed inwardly the support acts to prevent the weight of the flour resting upon the cut-off and throws the weight upon a support, which latter is in turn supported by the shoulders formed by the collar.

13 represents a cylindrical collar or sifting-section removably mounted and inclosing the lower end of the cylinder 1, and the same is provided upon its upper edge with recesses 14, adapted to receive guide-lugs 15, projecting from the exterior of the cylinder 1, and is supported in position upon the lower end of the cylinder by means of a series of hooks 16, pivotally connected to the cylinder and adapted to engage pins 17, projecting from the sifting-section. The sifting-section is provided with a screen 18, and over the same is extended a transverse keeper-bar 19, and between the keeper-bar and screen or sieve, and adapted to be reciprocated over the latter, is an agitator 20, extending through an opening in the wall of the sifting-section and terminating in an operating-handle 21.

22 represents a cup the upper edge of which at suitable intervals is provided with bayonet-slots 23, which are adapted to receive locking-pins 24, projecting from the lower surface of the sifter. From this it will be apparent that if a quantity of flour is desired for cooking the cut-off is first withdrawn and the agitator reciprocated, which forces flour through the sieve in a sifted condition into the removable cup. When a sufficient quantity has been sifted into the cup, the cut-off is pushed in and the cup removed and the flour placed in the waiting-receptacle. In this manner quantities of flour may be taken from the flour-cylinder, sifted, and carried to any desired point of use without spilling the same from the table or floor.

I have herein illustrated a spice-cabinet which forms a convenient attachment for the flour-receptacle, and the same consists of a rectangular box 25, the front wall of which is provided with a series of openings 26, having slides, and in each opening there is mounted a small drawer 27. The lower openings may be larger than the upper openings, but are of a similar construction. In these drawers may be contained various spices used in cooking. The rear wall of the cabinet is concaved, as at 28, and adapted to fit the cylinder 1, and the upper corners of the cabinet are provided with eyes 29, which are adapted to receive and be engaged by a pair of pivoted hooks 30, connected to the sides of the receptacle 1. Brackets 31 project from the flour-receptacle 1 near its lower end and serve to support the lower end of the cabinet.

Having thus described my invention and its operation, what I claim is—

1. The combination, with the cylindrical flour-receptacle adapted to be supported upon the wall and provided at diametrically-opposite sides with pivoted hooks 30 and below the same with lugs 31, of the case 25, provided with a series of spice-receiving drawers in its front and having its rear wall concaved to fit the flour-cylinder, the lower edge of said wall resting upon the lugs and the upper corner provided with eyes for the reception of the pivoted hook, substantially as specified.

2. The combination, with the flour-cylinder having the sliding cut-off, of the hemispherical flour-support provided with openings and adapted to feed flour to the cut-off, substantially as specified.

3. The combination of the flour-cylinder adapted to be supported upon a wall or other fixed object and provided with a removable cover, a cut-off mounted in the lower end of the cylinder, a flour-supporting frame mounted above the cut-off and having guides for the reception of the same, a sifting-section removably mounted below the cut-off and carrying a sieve and agitator, and a cup removably secured to the sifting-section, substantially as specified.

4. The combination of the flour-cylinder having a slot 6 in the side at the lower or discharge end, the cut-off 7, sliding in the slot, and the hemispherical open flour-supporting frame having its flat side facing the cut-off and provided with guides to receive the same, as set forth.

5. The flour-cylinder provided with a flour-supporting-frame of a hemispherical shape, the upper surface being convex and formed of a series of curved strips crossing each other and the bottom being flat and provided with a series of strips spaced apart to form feed-openings 11, as set forth.

6. The combination, with the flour-cylinder having a reduced lower end and an internal collar forming a shoulder, of an oblong cut-off partially closing the lower end of the cylinder and a hemispherical open flour-supporting frame having opposite guides for the reception and guidance of the cut-off, and having a partially-closed bottom taking over that portion of the lower end of the cylinder unoccupied by the cut-off, substantially as specified.

In testimony that I claim the foregoing as my own I have hereto affixed my signature in presence of two witnesses.

NANCY MALINDA HARRISON.

Witnesses:
W. H. BURR,
C. J. CRAMER.